US011238531B2

(12) United States Patent
Sarshogh et al.

(10) Patent No.: US 11,238,531 B2
(45) Date of Patent: Feb. 1, 2022

(54) CREDIT DECISIONING BASED ON GRAPH NEURAL NETWORKS

(71) Applicant: Capital One Services, LLC, McLean, VA (US)

(72) Inventors: Mohammad Reza Sarshogh, Bellevue, WA (US); Christopher Bruss, Washington, DC (US); Keegan Hines, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/857,780

(22) Filed: Apr. 24, 2020

(65) Prior Publication Data
US 2021/0334896 A1    Oct. 28, 2021

(51) Int. Cl.
*G06Q 40/02*     (2012.01)
*G06N 3/08*     (2006.01)
*G06N 3/04*     (2006.01)
*G06Q 10/10*     (2012.01)

(52) U.S. Cl.
CPC ............ *G06Q 40/025* (2013.01); *G06N 3/04* (2013.01); *G06N 3/08* (2013.01); *G06Q 10/10* (2013.01)

(58) Field of Classification Search
CPC ......... G06Q 10/10; G06Q 40/025; G06N 3/04
USPC ......................................................... 705/38
See application file for complete search history.

(56) References Cited

U.S. PATENT DOCUMENTS

| | | | |
|---|---|---|---|
| 9,659,248 B1 | 5/2017 | Barbosa et al. | |
| 10,445,062 B2 * | 10/2019 | Oberbreckling | G06F 16/2255 |
| 10,789,530 B2 | 9/2020 | Bruss et al. | |
| 2007/0050286 A1 * | 3/2007 | Abrahams | G06Q 40/04 705/38 |
| 2018/0165554 A1 | 6/2018 | Zhang et al. | |

OTHER PUBLICATIONS

Kulshrestha, "NLP 101: Word2Vec—Skip-gram and CBOW; A crash course in word embedding", Towards Data Science [online], Published on Nov. 24, 2019, 8 pages.
Devlin et al., "BERT: Pre-training of Deep Bidirectional Transformers for Language Understanding", Cornell University [online], arXiv:1810.04805v2 [cs.CL], Oct. 11, 2018, 35 pages.

(Continued)

*Primary Examiner* — Lindsay M Maguire
(74) *Attorney, Agent, or Firm* — Kacvinsky Daisak Bluni PLLC

(57) ABSTRACT

Systems, methods, and computer program products to provide credit decisioning based on graph neural networks. A lending network graph of a plurality of loans may be received, each loan associated with a creditor and one account. A first node of the graph may be associated with a first creditor and the second node may be associated with a first account. A graph neural network may receive a respective message from each node connected to the first node, each message comprising an embedding vector reflecting a current state of the node. The graph neural network may update weights for the first node in a forward pass. The graph neural network may receive a respective message from each node connected to the second node, each message comprising the embedding vector reflecting the current state of the node. The graph neural network may update weights for the second node in a backward pass.

20 Claims, 12 Drawing Sheets

(56) References Cited

OTHER PUBLICATIONS

Kuveljic, Stanko, "Beyond Word2Vec Usage For Only Words", Jan. 2018 [online] KDNuggets™ [retrieved on Jan. 14, 2019]. Retrieved from the Internet URL: https://www.kdnuggets.com/2018/01/beyond-word2vec-for-words.html.

Shogry, B., "Making Sense of messy bank data", Aug. 23, 2017 [online] Plaid blog [retrieved on Jan. 14, 2019], Retrieved from the Internet URL: https://blog.plaid.com/making-sense-of-messy-data/.

Krishan, "How to Use Words Co-Occurrence Statistics to Map Words to Vectors", Jun. 2015 [online] WordPress [retrieved on Jan. 14, 2019]. Retrieved from Internet URL: https://iksinc.online/2015/06/23/how-to-use-words-co-occurrence-statistics-to-map-words-to-vectors/.

Chablani, M., et al., "Word2Vec (skip-gram model): Part 1—Intuition", Jun. 2017 [online], Towards Data Science [retrieved on Jan. 14, 2019]. Retrieved from Internet URL: https://medium.com/towards-data-science/word2vec-skip-gram-model-part-1-intuition-78614e4d6e0b.

Author unknown, "Vector Representation of Words", Dec. 2018 [online] TensorFlow™ tutorial [retrieved on Jan. 14, 2019], Retrieved from Internet URL: https://www.tensorflow.org/tutorials/representation/word2vec.

Ziegler, K., et al., "Injecting Semantic Background Knowledge into Neural Networks Using Graph Embeddings", 2017 IEEE 26th International Conference on Enabling Technologies: Infrastructure for Collaborative Enterprises (WETICE), pp. 200-205, 2017.

Cao, S., et al., "Deep Neural Networks for Learning Graph Representations", Proceedings of 13th AAAI Conference on Artificial Intelligence, (AAAI-16), pp. 1145-1152, 2016.

Bahnsen, A. C., et al., "Feature Engineering Strategies for Credit Card Fraud Detection", Expert Systems with Applications, vol. 51, pp. 134-142, 2016.

Kipf, T., et al., "Semi-Supervised Classification with Graph Convolutional Networks", Cornell University [online], Submitted on Sep. 9, 2016 (v1), last revised Feb. 22, 2017 (this version, v4). Retrieved from Internet URL <https://arxiv.org/abs/1609.02907>. Retrieved on Apr. 8, 2020, 2 pages.

Kipf, T., et al., "Graph Convolutional Networks", Tkipf.github.io [online], Uploaded on Sep. 30, 2016. Retrieved From Internet URL: <https://tkipf.github.io/graph-convolutional-networks/>. Retrieved on Apr. 8, 2020, 15 pages.

Godec, P., "Graph Embeddings—The Summary", Towards Data Science [online], Uploaded Dec. 311, 2018. Retrieved from Internet URL: <https://towardsdatascience.com/graph-embeddings-the-summary-cc6075aba007?gi=61b56f320ee0> Retrieved on Apr. 8, 2020, 11 pages.

\* cited by examiner

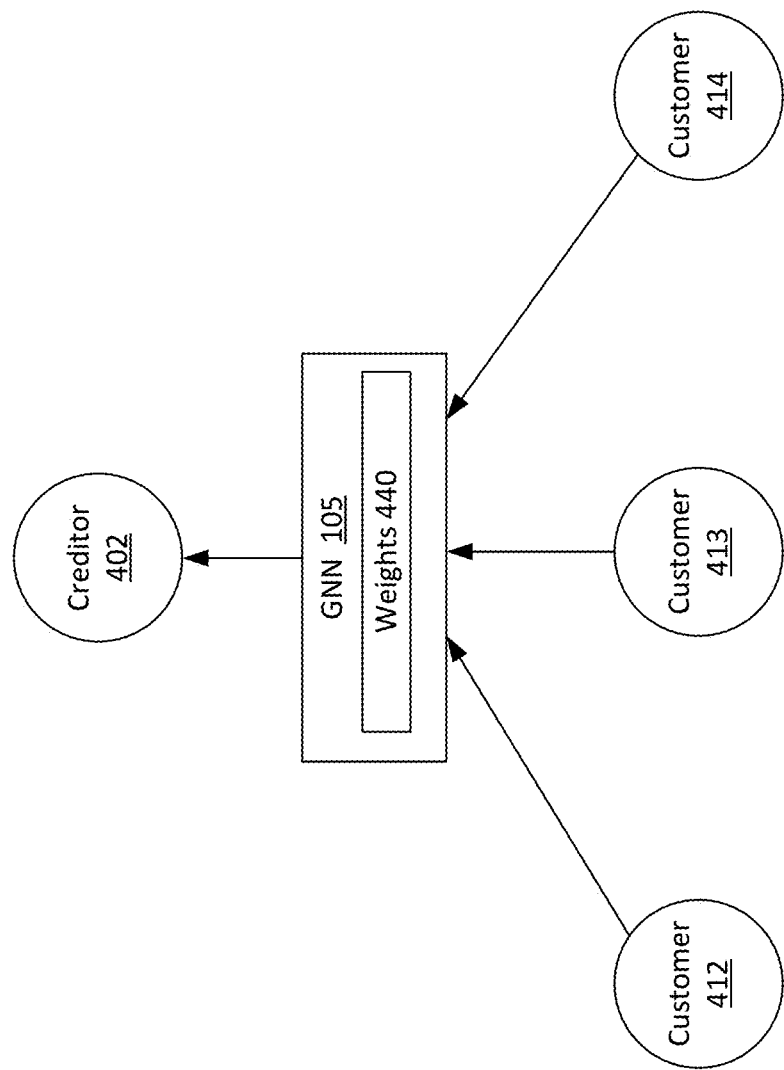

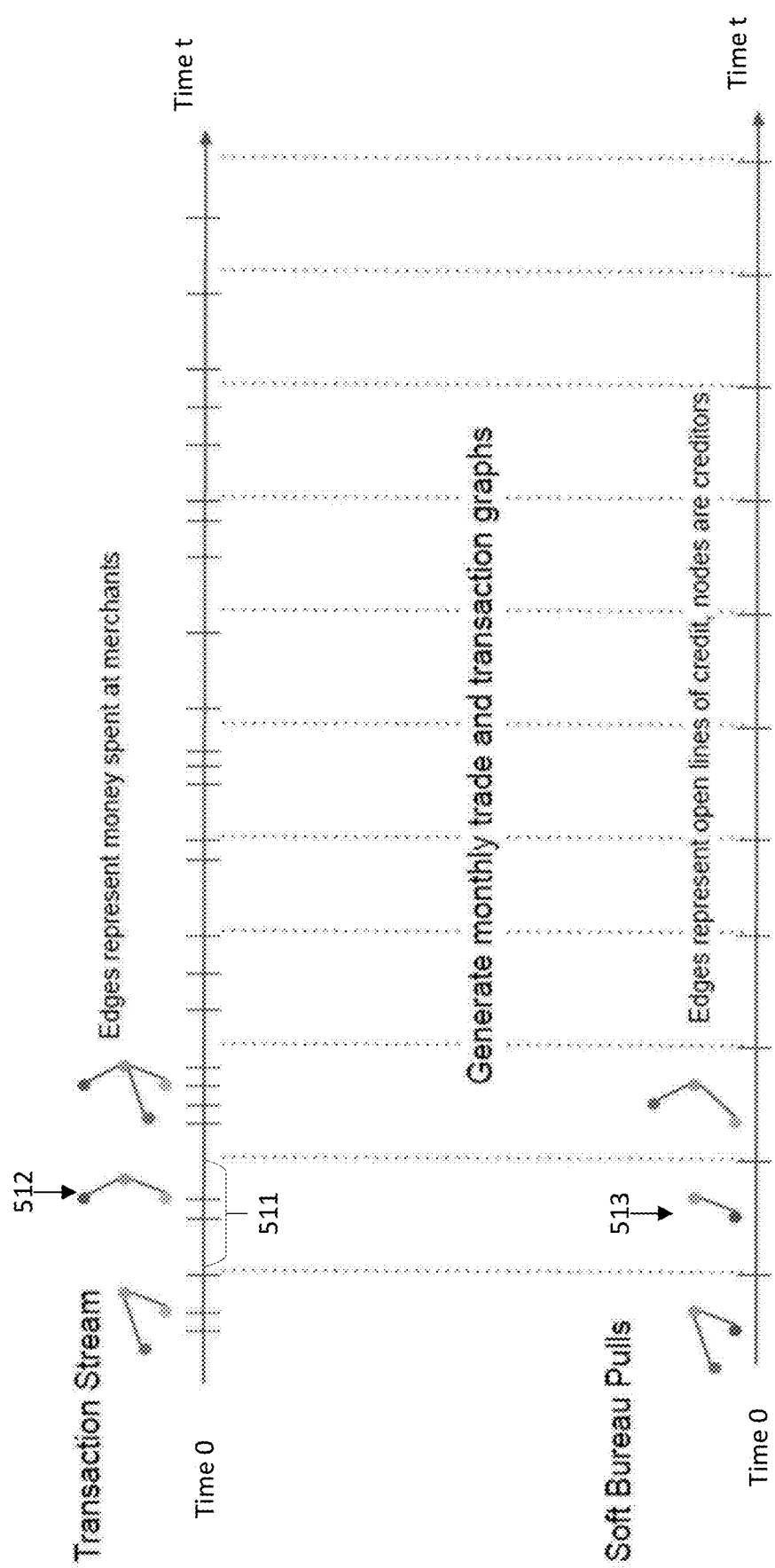

CREDIT DECISIONING BASED ON GRAPH NEURAL NETWORKS

TECHNICAL FIELD

Embodiments herein generally relate to computing, and more specifically, to computing solutions to provide credit decisioning based on graph neural networks.

BACKGROUND

Financial transactions represent a large network of relationships between entities. These entities can include relationships between merchants and account holders, accounts and other accounts, creditors and borrowers, financial institutions and other financial institutions, and equity holders or bond holders and companies. Such transaction networks are very high dimensional (e.g., millions or billions of entities) yet are simultaneously very sparse, as any given entity only interacts with a small subset of other entities. Furthermore, different data sources may provide different types of data. Using this data in machine learning is difficult because of the high-dimensionality and sparsity properties, and conventional machine learning models cannot scale to learn weights for the full dimensions of the network. Some conventional machine learning models use blunt techniques to reduce the dimensionality or the sparsity to a manageable size. However, these techniques lose significant amounts of relevant information.

SUMMARY

Embodiments disclosed herein include systems, methods, and computer program products to provide credit decisioning based on graph neural networks. In one example, a method comprises receiving a lending network graph generated based on a plurality of loans, each loan associated with at least one creditor of a plurality of creditors and one account of a plurality of accounts, the network graph comprising a plurality of nodes. The method may further comprise identifying, in the network graph, a first node and a second node of the plurality of nodes, the first node associated with a first creditor of the plurality of creditors and the second node associated with a first account of the plurality of accounts. The method may further comprise receiving, by a graph neural network, a respective message from each of a first subset of the plurality of nodes connected to the first node, each message comprising an embedding vector reflecting a current state of the respective node of the first subset, each node in the first subset of nodes associated with a respective account of the plurality of accounts. The method may further comprise updating, by the graph neural network in a forward pass of the graph neural network, the embedding vector for the first node. The method may further comprise receiving, by the graph neural network, a respective message from each of a second subset of the plurality of nodes connected to the second node, each message comprising the embedding vector reflecting the current state of the respective node of the second subset, each node in the second subset associated with a respective creditor of the plurality of creditors. The method may further comprise updating, by the graph neural network in a backward pass of the graph neural network, the embedding vector for the second node.

BRIEF DESCRIPTION OF THE DRAWINGS

FIGS. 4A-4C illustrate examples of training a neural network.
FIGS. 5A-5B illustrate examples of using a graph neural network for credit decisioning.

DETAILED DESCRIPTION

Figure 1:
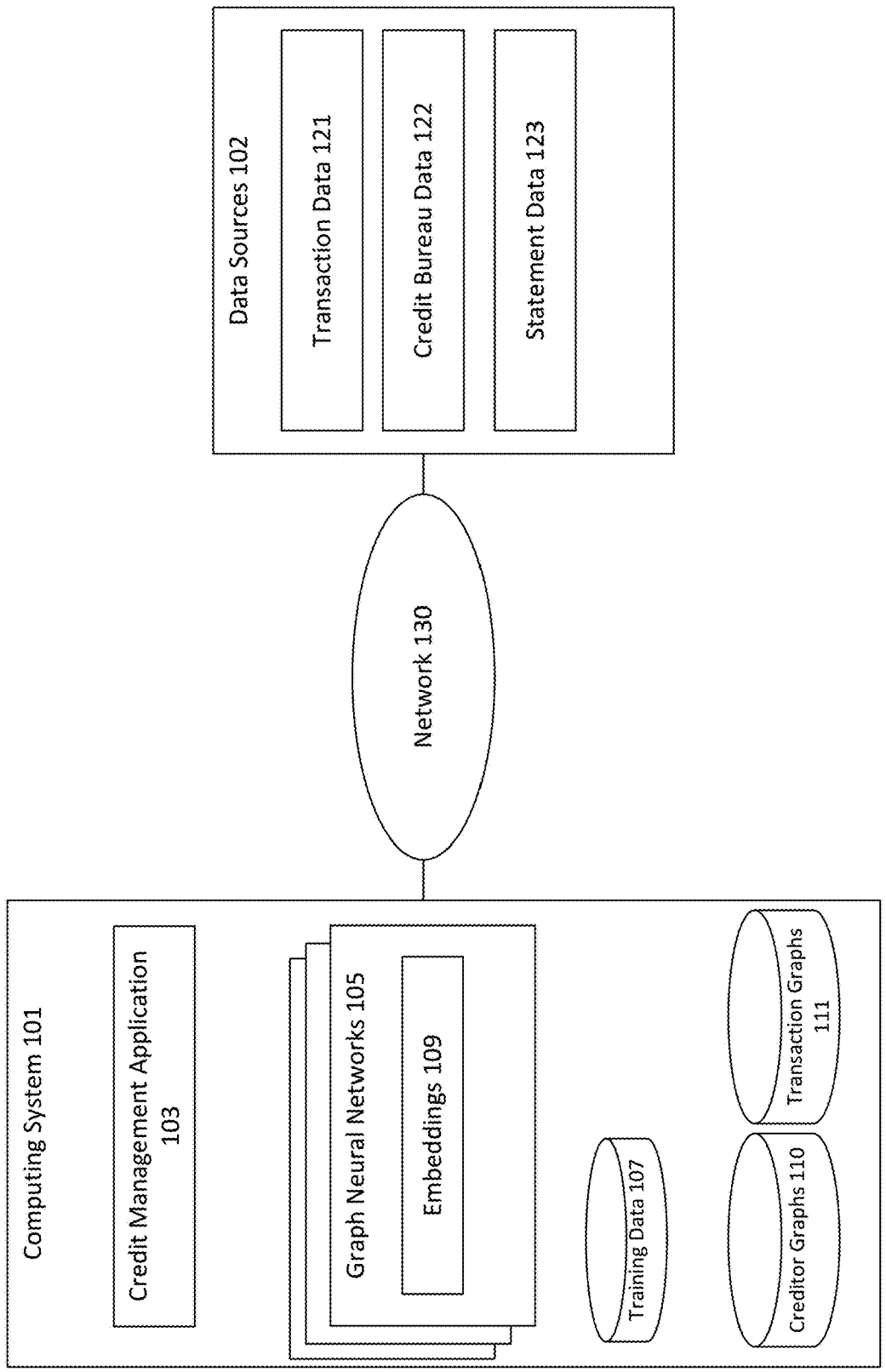
FIG. 1 illustrates an embodiment of a system.

Embodiments disclosed herein provide techniques for credit decisioning and/or credit line management based on graph neural networks. Generally, a credit network graph may represent relationships between creditors and borrowers. Each node in the credit network graph may represent a creditor or a borrower, and edges may represent a relationship (e.g. a loan) between two entities (e.g., a first creditor and a first borrower). An edge between two nodes may include a weight representing an amount of the loan. Each node may further include an embedding vector that represents a plurality of features of the entity represented by the node.

A graph neural network (GNN) may then process the credit network graph and other data describing a prospective borrower (e.g., a credit report, credit file, monthly statements, user profile, etc.) to compute one or more outputs reflecting a credit worthiness of the prospective borrower as part of a credit request. For example, the GNN may compute a score that is of a range of possible values for the score. If the score exceeds a threshold, the credit request may be approved.

A transaction network graph may represent transactions between different entities. Each node in the transaction network graph represents an entity. The entities may include consumers, merchants, and/or other entities involved in a given transaction in the network graph of transactions. A low-dimensional dense representation of the graph, e.g., an embedding vector, may include all information about each entity, such as the places a customer shops, and what types of customers shop at a given merchant.

The GNN periodically process updated instances of the credit network graph, the transaction graph, and the other data describing a prospective borrower to compute an optimal credit line for an account holder. For example, the GNN may compute an increased credit limit relative to an initial (or current) credit limit. Generally, the credit network graph and/or the transaction graph may be updated periodically (e.g., monthly) based on updated credit reports and/or transaction information respectively. Doing so allows the GNN to determine an optimal credit line in light of the most recent data describing the account holder (and/or other account holders).

In one embodiment, the GNN may be trained using neighborhood aware message passing, where each node in the graph passes a message to a target node. The message may comprise an embedding vector reflecting the current state of the corresponding node. Once the target node receives each message, the related values in each message (e.g., current debt level, number of defaults, etc.) may be averaged. A weight may then be applied to the averaged values, which may then be used at least in part to update the values (e.g., the embedding vector) of the target node.

Advantageously, embodiments disclosed herein successfully merge disparate types of data to be processed by a model, such as graph neural network, to predict an applicant's credit worthiness and/or optimal credit line. Advantageously, embodiments disclosed herein retain all data describing each entity (e.g., loans, merchant accounts, customer accounts, credit reports, monthly statements, etc.), thereby generating an improved solution that exposes robust features that can be used for any number and type of purpose.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1 depicts a schematic of an exemplary system 100, consistent with disclosed embodiments. As shown, the system 100 includes at least one computing system 101 and one or more data sources 102 communicably coupled via a network 130. The computing system 101 and data sources 102 are representative of any type of computing system or device, such as a server, compute cluster, cloud computing environment, virtualized computing system, and the like. The data sources 102 are further representative of entities such as databases, files, credit reporting bureaus, account statements, and transaction logs. Collectively, the data sources 102 provide transaction data 121, credit bureau data 122 (e.g., credit reports), and statement data 123 (e.g., bank statements, credit card statements, etc.). The data provided by the data sources 102 may be updated periodically as new transactions, loans, and/or credit reports are processed (e.g., hourly, daily, weekly, etc.).

The transaction data 121 is raw transaction data describing a plurality of card-based transactions, such as credit card transactions, debit card transactions, gift card transactions, and the like. The use of a particular payment type should not be considered limiting of the disclosure, as the disclosure is equally applicable to all types of transaction data. In one embodiment, the transaction data 121 is provided by the issuer of the cards used to complete each transaction. The transaction data 121 may include any number and type of attributes describing a given transaction. For example, the transaction data 121 may include at least an account identifier (e.g., a customer account number, a customer credit card number, a merchant account number, etc.), a merchant identifier (e.g., a merchant name), a timestamp associated with the transaction, an amount of the transaction, and a location of the transaction, among many other data attributes. As such, the data space of the transaction data 121 is high-dimensional, including data describing millions (or more) of unique accounts and merchants.

The transaction data 121 defines relationships between customer accounts and merchants. For example, when a customer purchases an item from a merchant, a relationship is defined. Similarly, when a merchant transacts with another merchant, a relationship is defined. Thus, the transaction data 121 can be leveraged to expose a variety of different attributes of the accounts, such as account activity, customer preferences, similarity to other accounts, and the like. However, the transaction data 121 is sparse, as any given customer account (which includes merchant accounts that perform transactions with other merchants) interacts with a small fraction of merchants. Similarly, any given merchant may interact with a fraction of the customer accounts. Therefore, the transaction data 121 implicitly creates a bipartite graph between accounts. This sparse, high-dimensional space is very difficult to use for desirable analysis purposes. Advantageously, however, the system 100 is configured to overcome these limitations and leverage the transaction data 121 to provide useful analytical tools, thereby exposing new functionality based on the transaction data 121 in its entirety.

The credit bureau data 122 is representative of any type of credit reporting data, including credit reports based on a "hard" credit pull and credit reports based on "soft" credit pulls. The hard credit pulls may provide more information than the soft credit pulls. Generally, each type of credit report may reflect loans received by the corresponding user, the lenders, the amounts of each loan, the type of each loan, the status of each loan (e.g., defaulted, paid in full, partially paid, current, etc.). The statement data 123 may include periodic statements describing one or more accounts, such as monthly checking account statements, monthly credit card statements, etc. The statement data 123 may further reflect whether balances have been paid, transactions, late fees, etc. In some embodiments, the statement data 123 is reflected in the credit bureau data 122.

As shown, the computing system 101 includes a credit management application 103, one or more graph neural networks (GNNs) 105, a data store of training data 107, one or more creditor graphs 110, and one or more transaction graphs 111. The credit management application 103 is generally configured to process requests (or applications) for credit (e.g., from a customer) and determine whether to approve and/or deny the credit requests. The requests may be for credit cards, loans, or any other extension of credit. The credit management application 103 may cause the GNNs 105 further determine an optimal amount of credit to extend to the applicant, which may occur as part of the request processing and/or subsequent to approving the credit request.

The credit management application 103 may receive the transaction data 121 of prior transactions from the data sources 102 to generate a transaction graph 111 of the transactions using one or more ETL functions. The ETL functions may generally include standardizing the transaction data 121 according to one or more formats, and assigning each unique entity (e.g., customer accounts and/or merchant accounts) a unique identifier. Similarly, the credit management application 103 may receive the credit bureau data 122 and/or statement data 123 to generate the creditor graph 110 reflecting loans (or extensions of credit) using one or more ETL functions. Doing so may standardize the credit bureau data 122 and/or statement data 123 according to one or more formats, and assigning each unique entity (e.g., creditors/lenders and/or debtors/borrowers) a unique identifier.

Each node in the creditor graph 110 may represent a creditor and/or a borrower, and edges may represent a relationship (e.g. a loan or other extension of credit) between two entities (e.g., a first creditor and a first borrower). An edge between two nodes in creditor graph 110 may include a weight representing an amount of the loan relationship. Each node may further include an embedding vector 109 that represents a plurality of features of the entity represented by the node.

The transaction data 121, credit bureau data 122, and statement data 123 collectively reflect a plurality of different attributes of customers, borrowers, creditors, transactions, loans, accounts, and the like. However, each data source may not provide a complete set of attributes. For example, a credit report from the credit bureau data 122 may reflect that a customer has paid off their mortgage in full. However, the transaction data 121 may not reflect that the customer has paid off their mortgage. As such, from the data sources 102, information that should be used when making credit decisions and/or modifying credit limits may inadvertently not be considered. Advantageously, however, embodiments disclosed provide machine learning systems that herein consider all relevant data, e.g., transaction data 121, credit bureau data 122, and statement data 123.

In one embodiment, the transaction data 121, credit bureau data 122, and/or statement data 123 are processed using graph embedding techniques. Examples of graph embedding techniques are included in U.S. patent application Ser. No. 16/246,911, filed Jan. 14, 2019. The aforementioned patent application is incorporated by reference herein in its entirety. For example, in an unsupervised manner, the graph embedding techniques capture periodic snapshots of the transactions in the transaction data 121 to learn a vector representation, e.g., an embedding vector 109, of every customer based on their transactions. Generally, doing so causes customers that frequently shop at similar merchants to be assigned embedding vectors 109 that point in similar directions (e.g., have similar embedding values). Once the embedding vectors 109 are learned, the vectors 109 may be used as features in a credit line model, e.g., a first graph neural network 105-1, to determine an optimal credit limit for the user. In some embodiments, a supervised learning approach may be used. For example, a graph neural network 105-2 may implement neighborhood aggregation to gather information about a given node (e.g., a customer or a merchant) based on which other nodes (e.g., other customers and/or merchants) the node is connected to. Using the neighborhood aggregation, the graph neural network 105-2 may learn to assign embedding vectors 109 to each node that minimize some prediction error.

For example, given a customer applying for credit who shops frequently at a specific set of merchants, the graph neural network 105-2 may learn that based on what is known about this set of merchants and the other customers that shopped there in the past, that this applicant is particularly risky and decide not to extend credit and/or raise their credit line. In this manner, risk propagates across the transaction network.

To do so, embodiments disclosed herein provide advantages over conventional graph networks, including graph convolution networks (GCNs). These conventional models operate exclusively on homogenous networks, meaning that all the nodes in the network are of the same type. However, in the case of transaction graphs 111, the nodes may be for merchants and/or customers, which are of different types. Similarly, when making lending decisions, the graph neural networks 105 consider credit applications and/or requests for credit line increases from customers.

Therefore, to handle the different scales of the different nodes in the transaction graphs 111, embodiments disclosed herein provide a batching solution to generate training data 107 to train the graph neural networks 105. In one embodiment, the batching solution selects edges based on their importance to the relevant customer (e.g., the credit applicant and/or whether to modify an existing line of credit for the customer). Importance sampling may be accomplished by taking the number of merchants that the customer shops at over the number of customers that shop at the specific merchant. This computed value (e.g., number of merchants the customer shops at divided by the number of customers that shop at a specific merchant) may reflect the relative importance of the edge, or the likelihood that the edge will be included in the sampling batch. Doing so ensures that more important edges will appear more frequently in any given node's batch.

To handle heterogeneity of the different data provided by the data sources 102, embodiments disclosed herein define two separate node aggregation models. For example, a first graph neural network 105-1 may correspond to merchants, while a second graph neural network 105-2 may correspond to customers. The node aggregation model for merchants will only produce a latent representation (e.g., an embedding vector 109) for that merchant and will not output a prediction (e.g., a credit-worthiness score and/or an optimal credit line). The node aggregation model for customers may take, as input, the samples from its neighborhood (with importance sampling) and receive the current latent representation (e.g., embedding vectors 109) of each merchant. The node aggregation model may then aggregate these vectors with the vector 109 for the customer. A final neural network model (e.g., a third graph neural network 105-3) may then take the output of the aggregated vectors to compute a final prediction about the customer (e.g., a score reflecting credit worthiness, an optimal credit line, etc.). However, the final neural network model may use the transaction data 121, the credit bureau data 122, and/or the statement data 123 as input. In an unsupervised training scenario, two vectors may be pre-trained for each customer account. One vector may be based on the network of merchants the customer is connected to in the transaction graph 111. The other vector may be based on the network of creditors the customer is connected to in the creditor graph 110. These two vectors may then be provided to a neural network (e.g., the graph neural network 105-3), or other nonparametric model (such as a random forest), to compute an output for the customer. In a supervised training scenario, the merchant graph neural network 105-1 and the customer graph neural network 105-2 may be included in the heterogenous graph neural network 105-3. In either scenario, the respective latent vectors 109 generated by the merchant graph neural network 105-1 and the customer graph neural network 105-2 may be concatenated into a dense layer to make a final prediction value for that customer (e.g., a credit-worthiness score and/or an optimal credit limit).

In some embodiments, a given neural network 105 may determine whether to extend credit to customer based on the creditor graphs 110 built based on the credit reports 122. Doing so allows the graph neural networks 105 to make credit decisions in the absence of transaction data 121 and/or transaction graphs 111 for a given credit application. In some such embodiments, the graph neural networks 105 may use the creditor graphs 110 and the transaction graphs 111 to proactively determine whether to change the credit limit of existing customers.

As stated, during the training of any of the graph neural networks 105, an embeddings vector (or layer) 109 of the graph neural network 105 is generated. In at least one embodiment, an embeddings vector 109 is an n-dimensional lookup table of floating point numerical values. In such embodiments, each unique entity ID (e.g., customer ID and merchant ID, or customer ID and lender ID) in the respective graphs 110, 111 is assigned a unique identifier corresponding to a row in the lookup table, such that each unique entity is represented in the embeddings vector 109. In some embodiments, the embedding layers 109 are initialized with initial values, which may be randomly assigned.

Figure 2:
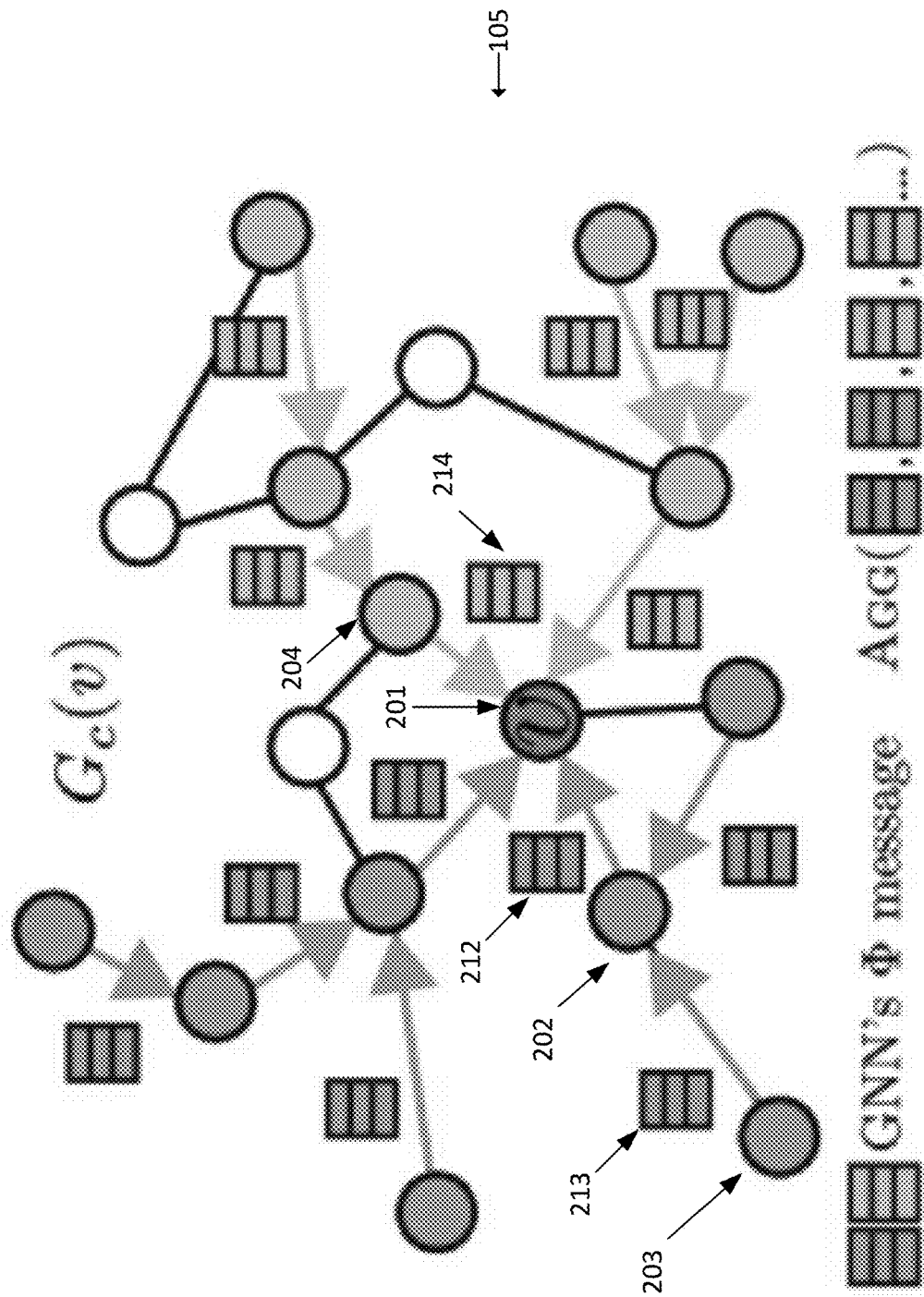
FIG. 2 illustrates an example of message passing in a neural network.

FIG. 2 is a schematic 200 illustrating an example of message passing in a graph neural network 105, according to one embodiment. As shown, the GNN 105 includes a plurality of nodes representing entities in a graph, such as the creditor graphs 110 and/or the transaction graphs 111. As stated, embodiments disclosed herein use message passing techniques to gather information when determining whether to extend credit and/or modify credit limits.

For example, a customer represented by a target node 201 may be applying for credit with an institution. The GNN 105 may therefore receive messages from a plurality of neighboring nodes, which may represent creditors and/or other customers. In one embodiment, the messages may be limited to a predefined number of hops, such as nodes that are within two or more hops of the target node. For example, as shown, nodes 202-204 may transmit messages 212-214 to the node 201. The messages 212-214 may include the embedding vector 109 for each corresponding node. More generally, the messages 212-214 reflect the current state of each corresponding node 202-204. Each node depicted in FIG. 2 may further transmit a message to the node 201, but not all messages and/or nodes are depicted for the sake of clarity.

Using the data provided in the messages, including messages 212-214, the GNN 105 may determine relevant features useful in generating a prediction, e.g., whether to extend credit, whether to increase a credit limit, etc. Similarly, the GNN 105 may further determine which features are not relevant in generating the prediction. In one embodiment, the GNN 105 processes each message by computing an average for each element of the embedding vector 109. For example, a first element of the embedding vector 109 may reflect a total amount of credit extended to the corresponding customer. In such an example, the GNN 105 may compute an average of the first element of the embedding vectors 109 received in the messages, including messages 212-214. Doing so may output an average amount of credit extended to the neighboring customers.

Regardless of the element (or feature) of the embedding vector 109, the GNN 105 may then apply a weight for the corresponding feature to the computed average value. Each element of the embedding vector 109 may be associated with a respective weight, e.g., specified by the node 201. For example, by multiplying a weight for the first feature (total credit) to the averaged credit amounts, the node 201 may compute a weighted average of total credit for all neighbors. Doing so may reflect a relative importance of each feature. For example, if the weighted average of the first feature is greater than the weighted average of a second feature, the GNN 105 may determine that the first feature is more important in determining whether to extend credit (and/or modify credit limits) than the second feature. In some embodiments, the GNN 105 may apply a non-linearity function to the weighted averages for each feature to compute the embedding vector 109 for the node 201.

Figure 3:
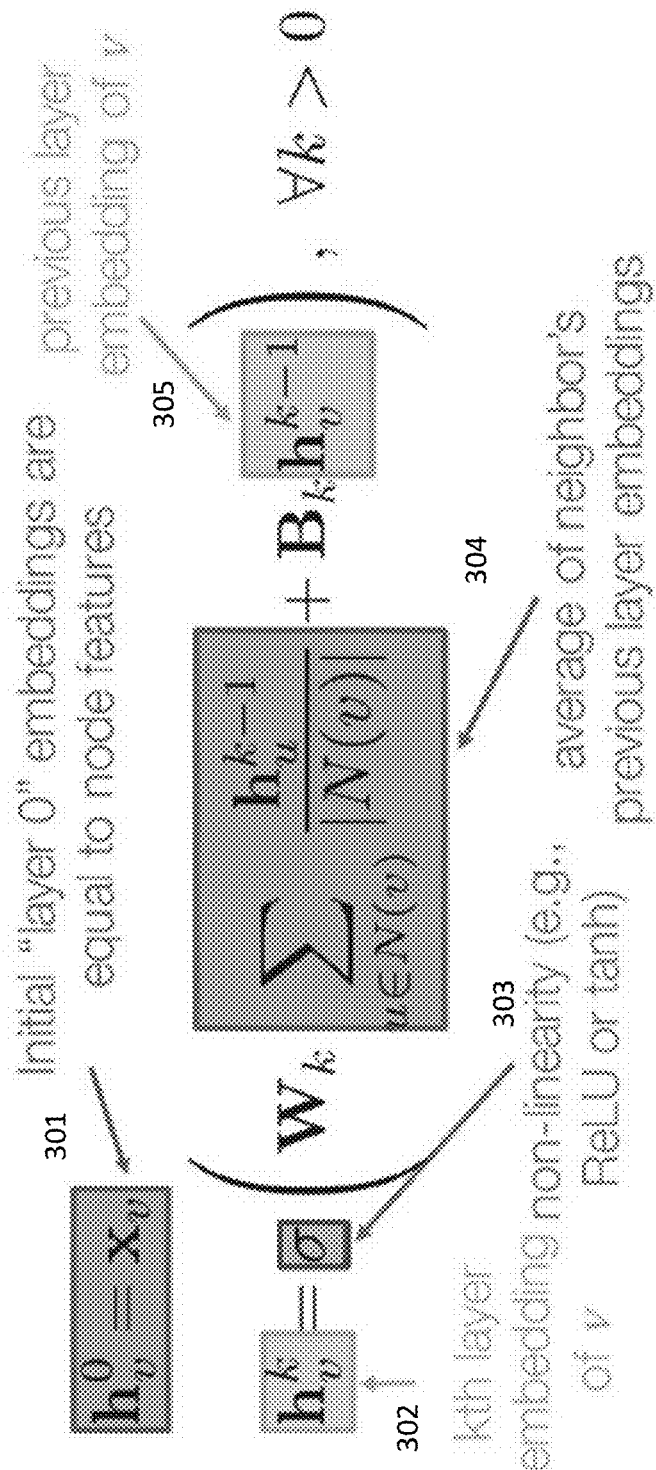
FIG. 3 illustrates an example of using message passing in a neural network to update embedding vectors.

FIG. 3 illustrates an example equation of operations performed by the GNN 105 to process the messages received from neighbors, such as the messages 212-214 of FIG. 2. As shown, the GNN 105 at block 301 may initialize the layer 0 embeddings of the vector 109 to equal the corresponding features of each node. To determine the $k^{th}$ layer embedding 302 of the embedding vector 109 (where k is any positive integer), the GNN 105 applies a non-linearity function 303 to a sum of the weighted average 304 of the neighboring node's previous layer of embeddings and the previous layer embedding 305 of the embedding vector 109.

As described in greater detail herein, embodiments may treat messages 212-214 differently for different types of entities. For example, in one embodiment, messages sent by creditors may be processed according to the techniques described in at least FIGS. 2-3 in one pass (or direction) of the GNN 105. Similarly, messages sent by other customers may be processed according to the techniques described in at least FIGS. 2-3 in a second pass of the GNN 105. The first and second passes may be opposite passes. For example, the messages sent by creditor nodes may be processed in a forward pass of training the GNN 105, while messages sent by the customer (or borrower) nodes in a backward pass while training the GNN 105. The training may generally produce the embeddings 109 for each node in the creditor graph 110.

Figure 4A:
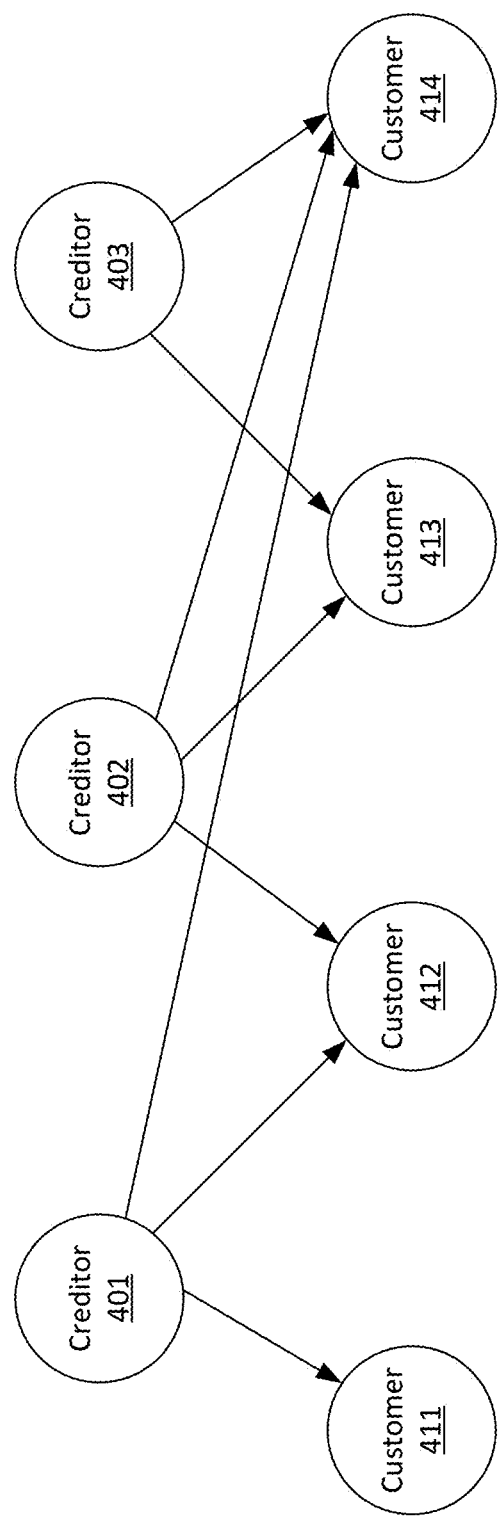

FIG. 4A is a schematic 400 illustrating a portion of a creditor graph 110, according to one embodiment. As shown, the creditor graph 110 includes nodes 401-403 which represent respective creditors. Similarly, the creditor graph 110 includes nodes 411-414 which represent respective customers. As shown, not all creditors are connected to all customers. For example, creditor 402 is connected to customers 412-414, but not customer 411.

FIG. 4B is a schematic 410 illustrating message passing techniques used to update the embedding vector 109 for the creditor node 402 and/or a plurality of weights of the GNN 105. Generally, a GNN 105 may receive messages (not shown) from customer nodes 412-414, as the creditor node 402 may be connected to creditor nodes 412-414 in the graph 110. However, a message is not received from customer node 411, as a relationship is not reflected between creditor 402 and customer 411 in the graph 110. The messages may correspond to the messages 212-214 of FIG. 2. The messages may include the current state of each customer node 412-414, which may include the embedding vector 109 for each corresponding node 412-414. As shown, the GNN 105 may process the messages to update the embedding vector 109 for the creditor node 402. For example, the GNN 105 may apply the equation in FIG. 3 to update the embedding vector 109 for the creditor node 402. As another example, the GNN 105 may additionally and/or alternatively update one or more weights 440 of the GNN 105. For example, the GNN 105 may compute an average for each value in the embedding vectors 109 received in the messages, apply one or more weights of the node 402 to the averaged values, and apply a non-linearity function to the weighted average to update the embedding vector 109 for the creditor node 402 and/or the weights 440 of the GNN 105. Doing so may reflect at least a portion of training the GNN 105 to learn the embedding vector 109 for the creditor node 402 and/or the weights 440 of the GNN 105. Generally, each weight of the plurality of weights 440 may correspond to an element of the embedding vectors 109.

Figure 4C:
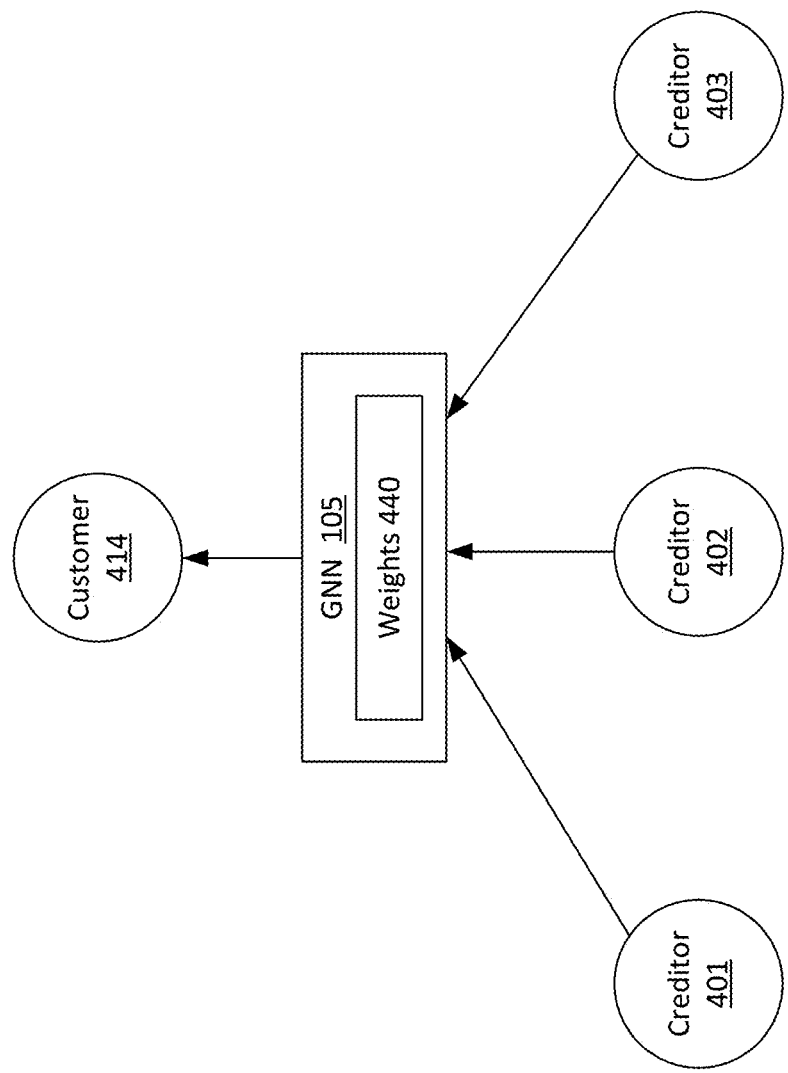

FIG. 4C is a schematic 415 illustrating message passing techniques used to update the embedding vector 109 for the customer node 414 and/or the weights 440 of the GNN 105. Generally, a GNN 105 may receive messages (not shown) from creditor nodes 401-403, as the customer node 414 may be connected to creditor nodes 401-403 in the graph 110 (e.g., the customer may have a loan with each creditor 401-403). The messages may correspond to the messages 212-214 of FIG. 2. The messages may include the current state of each creditor node 401-403, which may include the embedding vector 109 for each corresponding node 401-403. As shown, the GNN 105 may process the messages to update the embedding vector 109 for the customer node 414. As another example, the GNN 105 may additionally and/or alternatively update one or more weights 440 of the GNN 105. For example, the GNN 105 may apply the equation in FIG. 3 to update the embedding vector 109 for the customer node 414. For example, the GNN 105 may compute an average for each value in the embedding vectors 109 received in the messages, apply one or more weights of the node 402 to the averaged values, and apply a non-linearity function to the weighted average to update the embedding vector 109 for the customer node 414 and/or the weights 440 of the GNN 105. Doing so may reflect at least a portion of training the GNN 105 to learn the embedding vector 109 for the customer node 414 and/or the weights 440 of the GNN 105.

For example, once the weights 440 and the embedding vectors 109 are learned, a customer may apply for credit. The credit management application 103 may receive the application. The customer may correspond to node 414. The credit management application 103 and/or the GNN 105 may receive relevant data from the data sources 102 describing the customer. For example, the data may include a hard-pull credit report, financial statements, transaction data, and any other type of data. Collectively, the received data may describe a plurality of attributes of the applying customer (e.g., age, income, address, etc.). The GNN 105 may the identify the node 414 corresponding to the customer and receive messages from neighboring nodes in the graph 110. The GNN 105 may then apply the weights 440 to the input data and/or the embedding vector 109 to compute an output. The output may be a score reflecting the credit worthiness of the customer. If the score exceeds a threshold, credit management application 103 may approve the credit application. In some embodiments, the output may include an initial credit line (e.g., an initial amount of credit). As disclosed herein, the credit management application 103 may periodically cause the GNN 105 to update the customer's current credit line.

FIG. 5A is a schematic illustrating a timeline 500, according to various embodiments of the disclosure. As shown, the timeline 500 reflects periodic time intervals, such as the interval 511, which may correspond to different units of time (e.g., months, weeks, days, etc.). Generally, the top portion of the timeline 500 reflects a transaction stream where the credit management application 103 collects transaction data 121 for each customer. The credit management application 103 may then generate and/or update the transaction graph 111 to reflect the latest set of transactions for each customer. As stated, the transaction graph 111 may include a node for each entity, and an edge between two entities reflects at least one transaction between the entities. An example set of nodes/edges 512 is depicted in FIG. 5A. In some embodiments, the weight of each edge may be an amount spent for each (or all) transactions between the entities.

The bottom portion of the timeline 500 reflects "soft" bureau pulls, which may correspond to soft credit reports. Generally, the credit management application 103 may request the credit reports for each customer in the graphs 110 and/or 111. The credit management application 103 may then receive the credit reports as the credit bureau data 122. The credit management application 103 may then generate and/or update the creditor graphs 110 to reflect any new lines of credit for each customer. An example portion 513 of a creditor graph 110 is depicted in FIG. 5A.

Figure 5B:
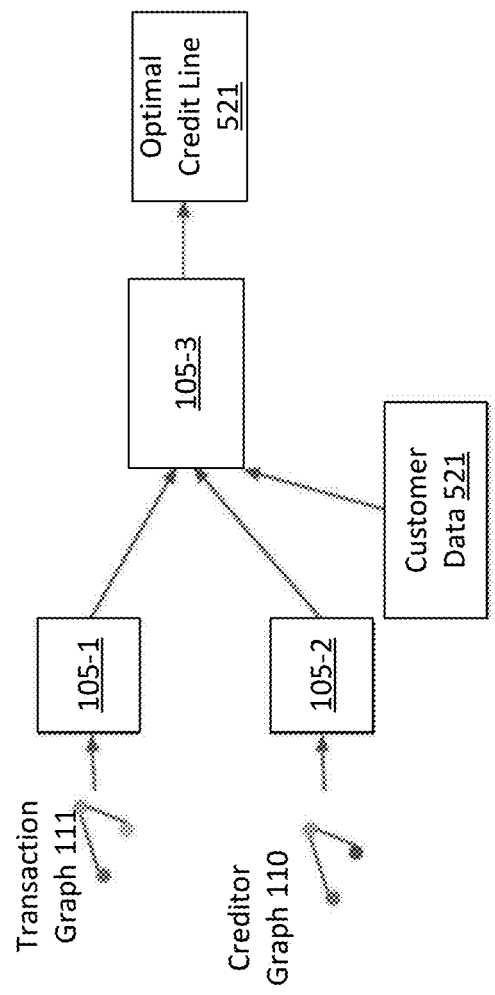

FIG. 5B illustrates an embodiment of the credit management application 103 using graphs to determine an optimal credit line 521 for a given customer. For example, 6 months after a customer opens a credit card account, the credit management application 103 may generate the transaction graph 111 and the creditor graph 110, where the graphs 110, 111 reflect transactions and lines of credit opened by the customer in the preceding month. The credit management application 103 may provide the transaction graph 111 to a first GNN 105-1 and the creditor graph 110 to a second GNN 105-2. The output of the GNNs 105-1, 105-2 is a respective vector, which is provided as input to a third GNN 105-3. The vector outputted by GNN 105-1 may be an embedding vector 109 that is a representation of each transaction in the transaction graph 111. Similarly, the vector outputted by GNN 105-2 may be an embedding vector 109 that is a representation of each loan reflected in the creditor graph 110. The GNN 105-3 may concatenate the output vectors, and compute an output comprising the optimal credit line 521 for the customer at the current time. For example, the optimal credit line may be $10,000, while the customer's current credit line is $5,000. Therefore, the GNN 105-3 may determine that the customer should be extended an additional $5,000 in credit. The credit management application 103 may cause the optimal credit line 521 to be determined for each customer in the graph 110. Similarly, the credit management application 103 may cause the optimal credit lines to be updated at periodic intervals, e.g., monthly, quarterly, yearly, etc.

Although the GNN 105-3 is depicted as a graph neural network, other types of machine learning models may be used to perform the functionality described herein. For example, because the graphs 110, 111 have been aggregated over and the vectors have been normalized, any type of machine learning model may be used to determine an updated credit limit. For example, a multi-layer perceptron (MLP) may be used. In a fully supervised setting, the MLP may be connected to the GNNs 105-1 and 105-2 such that all weights are updated in a backward pass. In an unsupervised setting, the input vectors to the MLP may be precomputed such that the MLP learns the final transformation.

Figure 6:
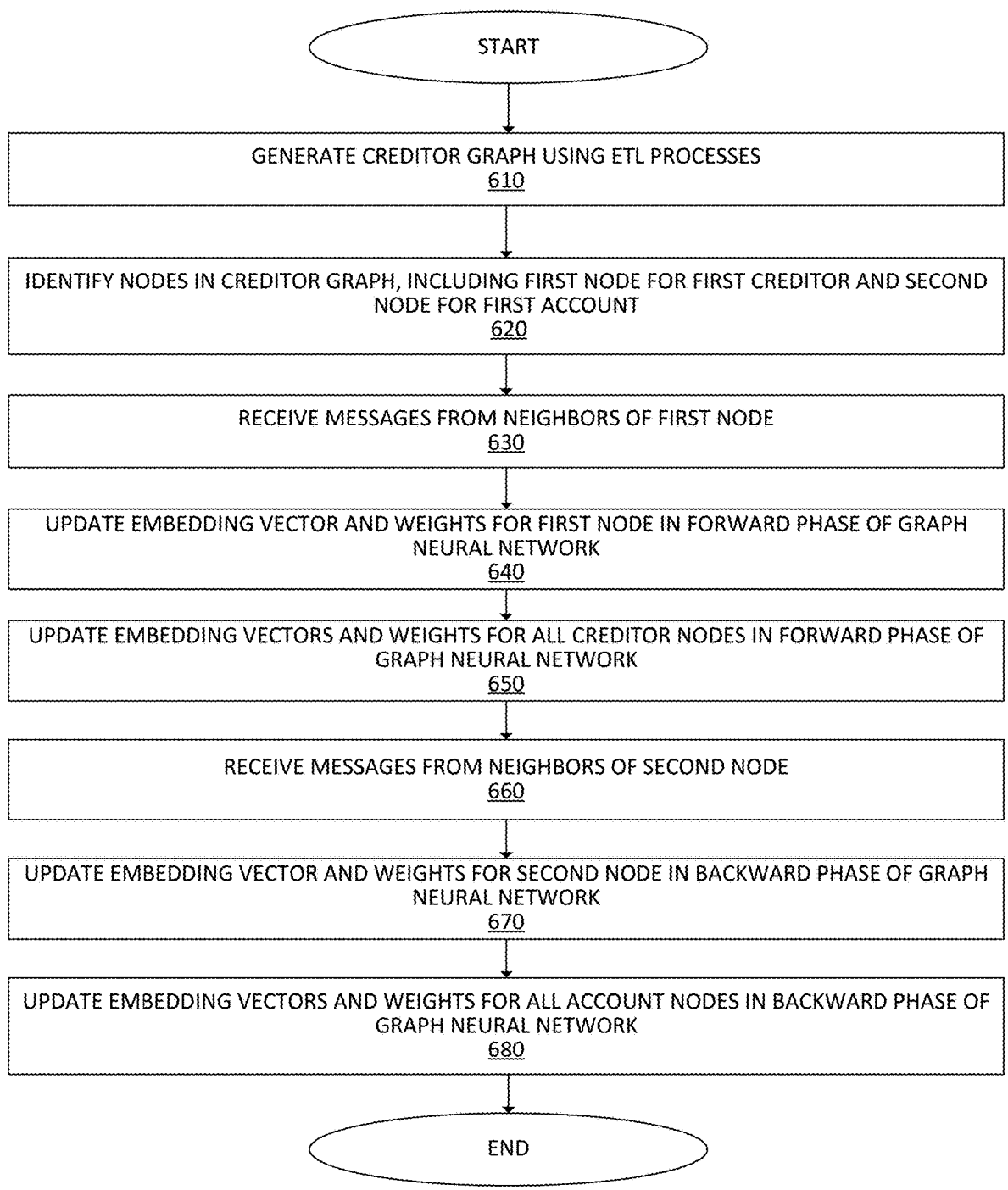
FIG. 6 illustrates an embodiment of a first logic flow.

FIG. 6 illustrates an embodiment of a logic flow 600. The logic flow 600 may be representative of some or all of the operations executed by one or more embodiments described herein. For example, the logic flow 600 may include some or all of the operations to train a graph neural network 105. Embodiments are not limited in this context.

As shown, the logic flow 600 begins at block 610, where the credit management application 103 generates a creditor graph 110 using one or more ETL processes applied to credit bureau data 122, e.g., a full credit report, or a hard pull credit report, for each of a plurality of customers. The creditor graph 110 may further be generated based on other types of data, such as bank statements, user profiles, or any other type of data received from the data sources 102. At block 620, the credit management application 103 identifies two nodes in the creditor graph 110. A first node may correspond to a creditor, and a second node may correspond to a customer.

At block 630, the GNN 105 may receive a plurality of messages from a plurality of neighbors of the first node. As stated, the messages may include embedding vectors 109 reflecting the current state of each neighbor (or neighbors within a predefined number of graph hops of the first node). At block 640, the GNN 105 updates the embedding vector 109 and/or the weights of the first node in a forward phase of the GNN 105. As stated, the GNN 105 may compute, for each element of the embedding vector, a respective average based on the messages received at block 630. The GNN 105 may then apply the weights of the first node to the average values. The GNN 105 may then apply a function to the weighted averages to update the weights and/or the embedding vector 109 for the first node. At block 650, the GNN 105 updates embedding vectors and/or weights for all creditor nodes in the graph 110, e.g., by returning to block 630 for each creditor node in the graph to receive messages from each neighbor of the creditor node. Similarly, by proceeding to block 640, the embedding vector and/or weights for each creditor node is updated.

At block 660, the GNN 105 may receive a plurality of messages from a plurality of neighbors of the second node. As stated, the messages may include embedding vectors 109 reflecting the current state of each neighbor (or neighbors within a predefined number of graph hops of the second node). At block 670, the GNN 105 updates the embedding vector 109 and/or the weights of the second node in a backward phase of the GNN 105. As stated, the GNN 105 may compute, for each element of the embedding vector, a respective average based on the messages received at block 660. The GNN 105 may then apply the weights of the second node to the average values. The GNN 105 may then apply a function to the weighted averages to update the weights and/or the embedding vector 109 for the second node. At block 680, the GNN 105 updates embedding vectors and/or weights for all customer (or borrower) nodes in the graph 110, e.g., by returning to block 650 for each customer node in the graph to receive messages from each neighbor of the customer node. Similarly, by proceeding to block 660, the embedding vector and/or weights for each customer node is updated.

Once the GNN 105 is updated, the GNN 105 may be used to perform an operation. For example, the GNN 105 may receive a full credit report for a customer requesting a new line of credit, mortgage, etc. The GNN 105 may use the attributes of the credit report, the embedding vectors 109, and the weights of the GNN 105 to compute an output. The output may reflect a creditworthiness of the applicant (and/or a level of risk associated with the applicant). If the creditworthiness output (e.g., a score on a range of possible scores) exceeds a threshold, the credit application may be granted. Otherwise, the credit application may be denied.

Figure 7:
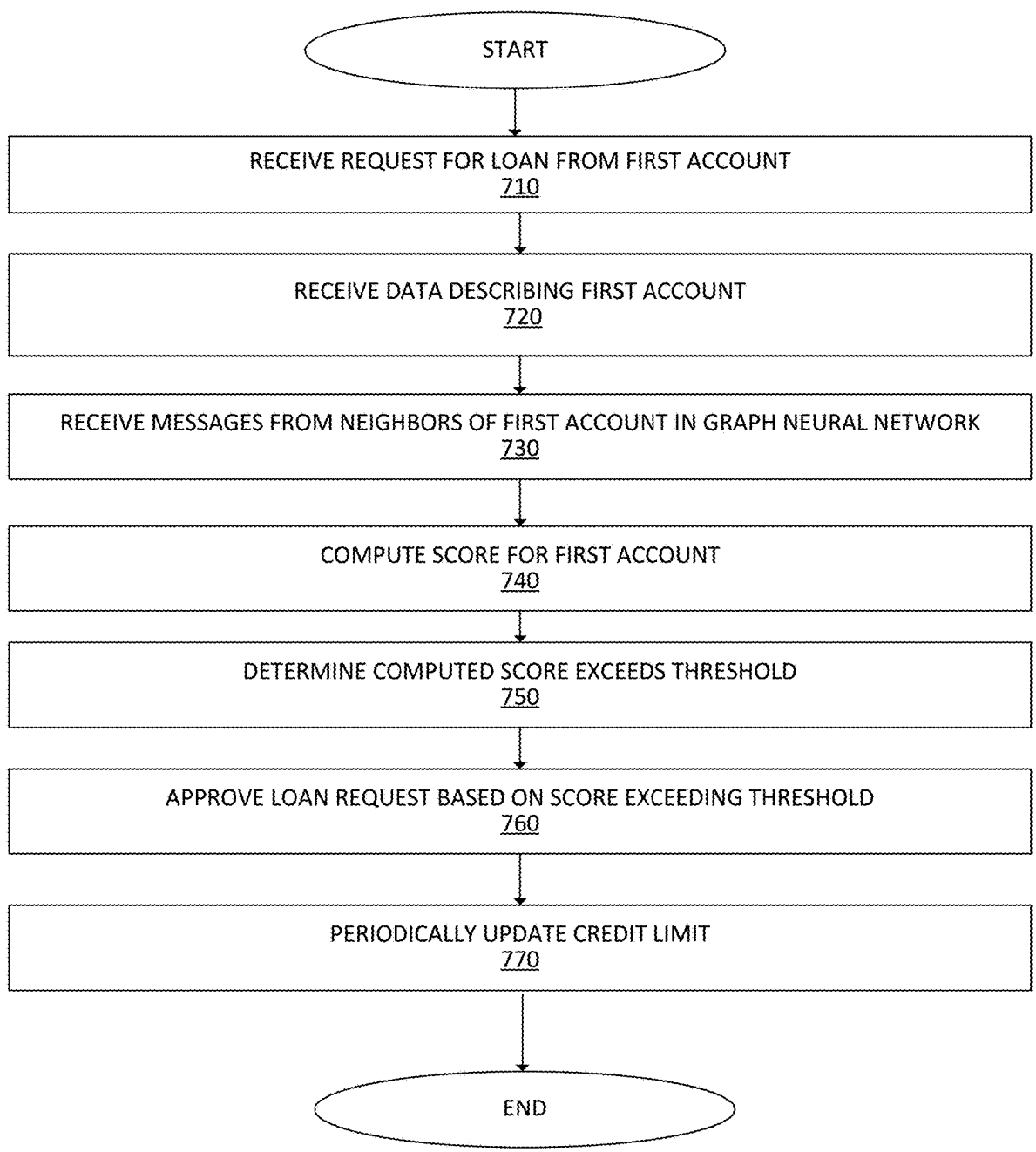
FIG. 7 illustrates an embodiment of a second logic flow.

FIG. 7 illustrates an embodiment of a logic flow 700. The logic flow 700 may be representative of some or all of the operations executed by one or more embodiments described herein. For example, the logic flow 700 may include some or all of the operations performed to use a GNN 105 to process a request for credit. Embodiments are not limited in this context.

As shown, the logic flow 700 begins at block 710, where a request for a loan is received from a first customer. The request for the loan may be a request for any type of loan and/or credit, such as a mortgage, credit card, home equity line of credit, etc. At block 720, data describing the first customer is received. For example, a full credit report may be received. At block 730, messages are received from each neighboring node of the first customer in the GNN 105. The messages may include the embedding vector 109 for each neighboring node.

At block 740, the GNN 105 computes a score for the first customer. For example, the GNN may compute a score of 0.8202 for the first customer by applying the weights of the graph neural network to the input data. At block 750, the GNN 105 may compare the computed score to a threshold. For example, if the threshold score is 0.8000, the GNN may determine that the score of 0.8202 exceeds the threshold. At block 760, the GNN 105 approves the loan request based on the score exceeding the threshold. At block 770, the GNN 105 may periodically update the credit limit for the customer, e.g., monthly, quarterly, etc.

Figure 8:
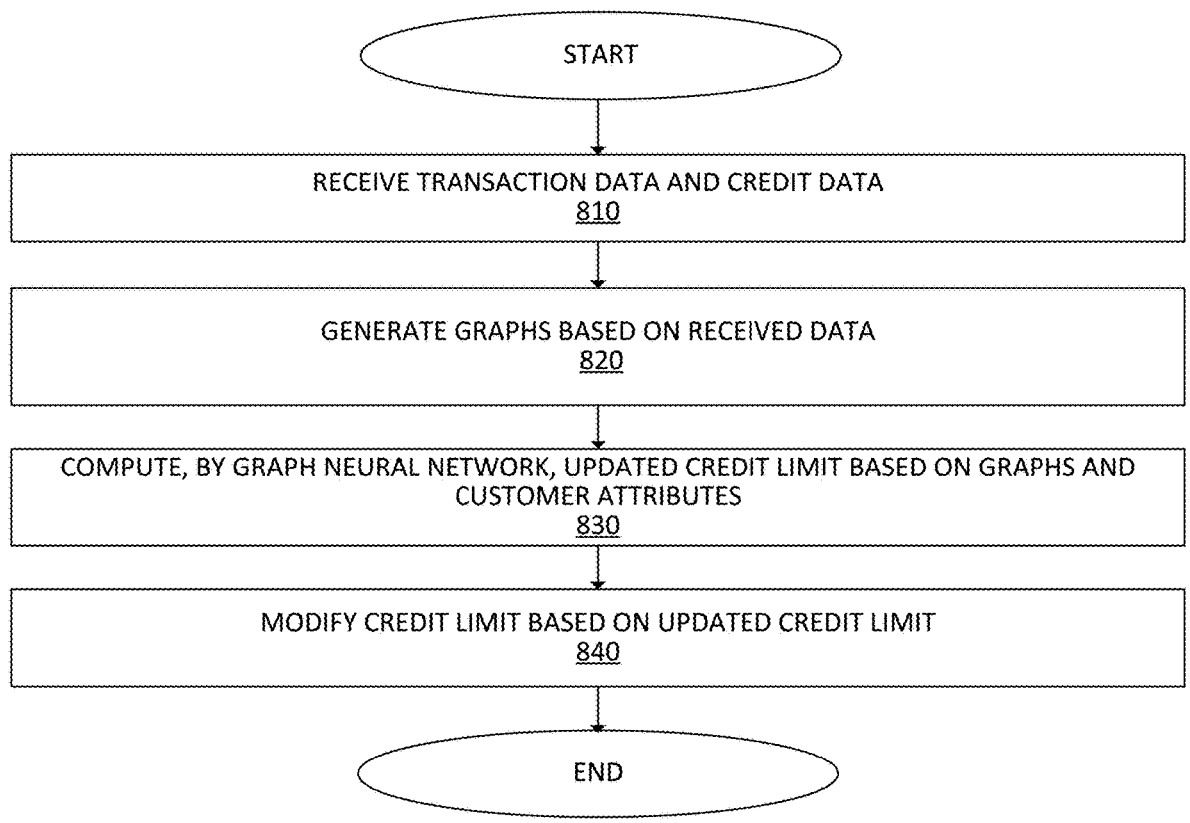
FIG. 8 illustrates an embodiment of a third logic flow.

FIG. 8 illustrates an embodiment of a logic flow 800. The logic flow 800 may be representative of some or all of the operations executed by one or more embodiments described herein. For example, the logic flow 800 may include some or all of the operations performed by the GNN 105 to update the credit limit of a customer. Embodiments are not limited in this context.

As shown, the logic flow 800 begins at block 810, where transaction data and credit bureau data (e.g., soft pull credit reports) are received for a given customer. The received data may be limited to a predefined period of time (e.g., the previous 30 days). At block 820, a credit graph 110 and/or a transaction graph 111 may be computed based on the credit reports and the transaction data, respectively. At block 830, the GNN 105 may compute an updated credit limit based on the graphs 110, 111 as well as any other relevant customer data. As stated, block 830 may comprise a first GNN 105-1 processing the credit graph 110 to compute an embedding vector for the credit relationships in the graph 110, and a second GNN 105-2 processing the transaction graph 111 to compute an embedding vector for the transactions in the transaction graph 111. A third GNN 105-3 may then concatenate the vectors outputted by the GNNs 105-1 and 105-2, process the concatenated vectors, and compute an updated credit limit. The updated credit limit may be the same or different than a current credit limit of the customer. At block 840, the credit limit of the customer may be updated according to the output generated at block 830.

Figure 9:
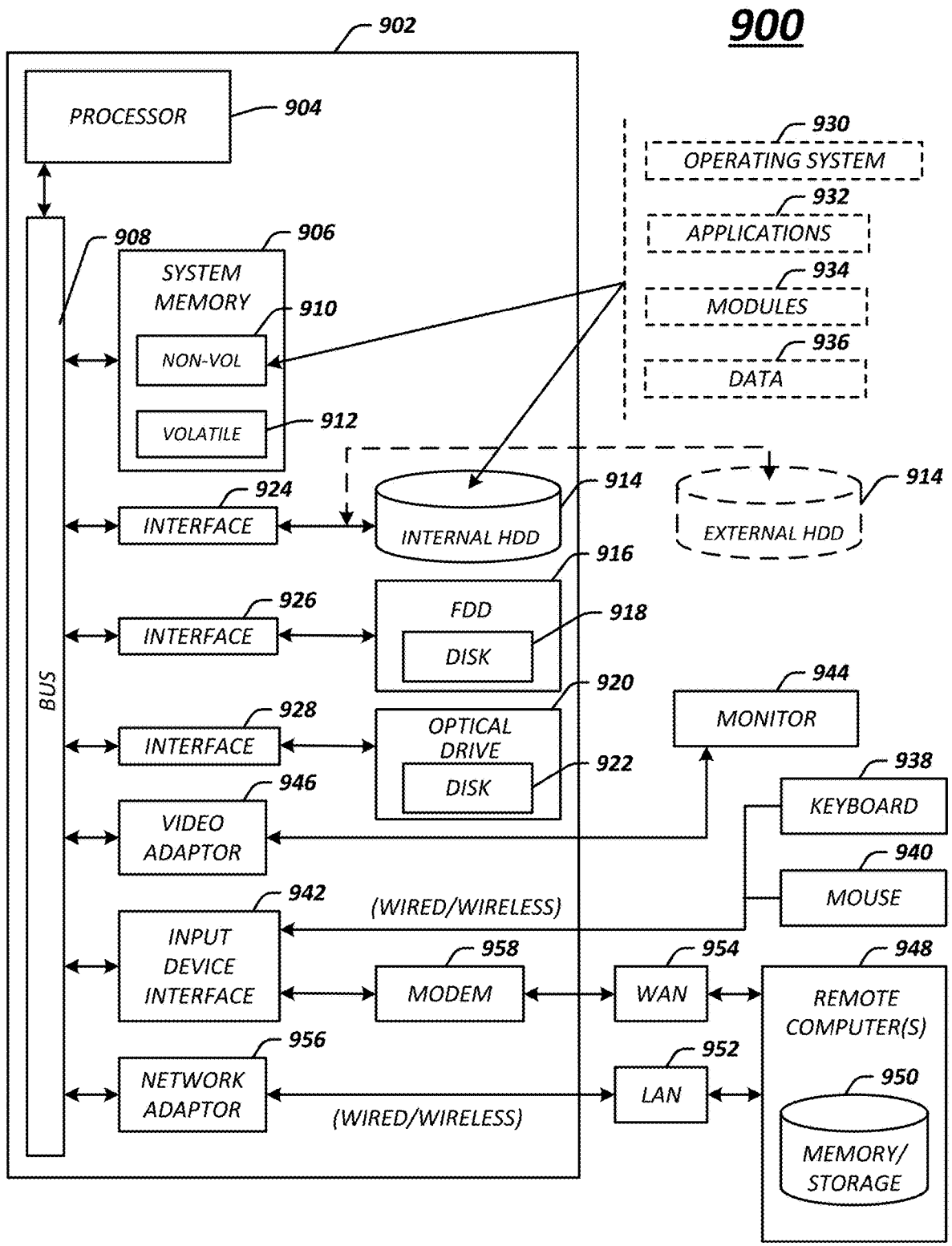
FIG. 9 illustrates an embodiment of a computing architecture.

FIG. 9 illustrates an embodiment of an exemplary computing architecture 900 comprising a computing system 902 that may be suitable for implementing various embodiments as previously described. In various embodiments, the computing architecture 900 may comprise or be implemented as part of an electronic device. In some embodiments, the computing architecture 900 may be representative, for example, of a system that implements one or more components of the system 100. In some embodiments, computing system 902 may be representative, for example, of the computing system 101 and data sources 102 of the system 100. The embodiments are not limited in this context. More generally, the computing architecture 900 is configured to implement all logic, applications, systems, methods, apparatuses, and functionality described herein with reference to FIGS. 1-8.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 902 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 902.

As shown in FIG. 9, the computing system 902 comprises a processor 904, a system memory 906 and a system bus 908. The processor 904 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 904.

The system bus 908 provides an interface for system components including, but not limited to, the system memory 906 to the processor 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computing system 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies. The computing system 902 is generally is configured to implement all logic, systems, methods, apparatuses, and functionality described herein with reference to FIGS. 1-8.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100, e.g., credit management application 103, graph neural networks 105, training data 107, embeddings 109, creditor graphs 110, transaction graphs 111, the transaction data 121, the credit bureau data 122, and the statement data 123.

A user can enter commands and information into the computing system 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computing system 902. In addition to the monitor 944, a computer typically includes other peripheral output devices, such as speakers, printers, and so forth.

The computing system 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computing system 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 952 and the WAN 954.

When used in a LAN networking environment, the computing system 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computing system 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computing system 902, or portions thereof, can be stored in the remote memory/storage device 950. It will be appreciated that the network connections shown are exemplary and other means of establishing a communications link between the computers can be used.

The computing system 902 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A system, comprising:
   a processor circuit; and
   a memory storing instructions which when executed by the processor circuit cause the processor circuit to, at each of a plurality of time intervals:
   receive a lending network graph generated based on a plurality of loans, each loan associated with at least one creditor of a plurality of creditors and one account of a plurality of accounts, the lending network graph comprising a plurality of nodes;
   identify, in the lending network graph, a first node and a second node of the plurality of nodes, the first node associated with a first creditor of the plurality of creditors and the second node associated with a first account of the plurality of accounts;
   receive, by a graph neural network, a respective message from each of a first subset of the plurality of nodes connected to the first node, each message comprising an embedding vector reflecting a current state of the respective node of the first subset at the respective time interval, each node in the first subset of nodes associated with a respective account of the plurality of accounts;
   update, by the graph neural network in a forward pass of the graph neural network, a plurality of weights for the first node at the respective time interval;
   receive, by the graph neural network, a respective message from each of a second subset of the plurality of nodes connected to the second node, each message comprising the embedding vector reflecting the current state of the respective node of the second subset at the respective time interval, each node in the second subset associated with a respective creditor of the plurality of creditors;
   update, by the graph neural network in a backward pass of the graph neural network, a plurality of weights for the second node at the respective time interval;
   receive a credit limit of a first account;
   compute, by the graph neural network based on a plurality of attributes of the first account, the updated plurality of weights for the first node, the updated plurality of weights for the second node, and the lending network graph, an updated credit limit for the first account, the updated credit limit corresponding to the respective time interval; and
   store the updated credit limit for the first account as the credit limit for the first account during the respective time interval.

2. The system of claim 1, the memory storing instructions which when executed by the processor circuit cause the processor circuit to, at each time interval:
   determine a plurality of features of the embedding vector, each feature corresponding to a respective element of the embedding vector;
   compute, by the graph neural network, a respective first average for each feature of the embedding vector based on the messages received from the first subset of nodes;
   apply, by the graph neural network, a respective weight of a plurality of weights for the first node to the first average for each feature; and
   apply, by the graph neural network, a non-linearity function to the weighted first average for each feature to update the plurality of weights for the first node in the forward pass of the graph neural network.

3. The system of claim 2, the memory storing instructions which when executed by the processor circuit cause the processor circuit to, at each time interval:
   compute, by the graph neural network, a respective second average for each feature of the embedding vector based on the messages received from the second subset of nodes;
   apply, by the graph neural network, a respective weight of a plurality of weights for the second node to the second average for each feature; and
   apply, by the graph neural network, the non-linearity function to the weighted second average for each feature to update the plurality of weights for the second node in the backward pass of the graph neural network.

4. The system of claim 3, the memory storing instructions which when executed by the processor circuit cause the processor circuit to, prior to a first time interval of the plurality of time intervals:
   receive a credit request from the first account;
   receive the plurality of attributes associated with the first account, wherein at least a portion of the plurality of attributes are specified in a first credit report for the first account; and
   compute, by the graph neural network based on the plurality of attributes and the lending network graph, a score for the first credit request; and
   approve the first credit request based on the score exceeding a threshold.

5. The system of claim 4, wherein the graph neural network receives a respective second message from each node of the first subset to compute the score for the first credit request.

6. The system of claim 4, the memory storing instructions which when executed by the processor circuit cause the processor circuit to, at each time interval:
   receive a graph of transaction data based on a plurality of transactions for the first account, the plurality of transactions associated with the respective time interval; and
   receive the plurality of attributes associated with the first account, at least a portion of the plurality of attributes specified in a second credit report for the first account, the second credit report associated with the respective time interval; and
   wherein the updated credit limit is further computed for the respective time interval based on the graph of transaction data.

7. The system of claim 1, wherein the graph neural network updates the embedding vector for each of the plurality of nodes associated with creditors in the forward pass, wherein the graph neural network updates the embedding vector for each the plurality of nodes associated with accounts in the backward pass.

8. A non-transitory computer-readable storage medium storing instructions that when executed by a processor of a computing device, cause the processor to:
at each of a plurality of time intervals:
receive a lending network graph generated based on a plurality of loans, each loan associated with at least one creditor of a plurality of creditors and one account of a plurality of accounts, the lending network graph comprising a plurality of nodes;
identify, in the lending network graph, a first node and a second node of the plurality of nodes, the first node associated with a first creditor of the plurality of creditors and the second node associated with a first account of the plurality of accounts;
receive, by a graph neural network, a respective message from each of a first subset of the plurality of nodes connected to the first node, each message comprising an embedding vector reflecting a current state of the respective node of the first subset at the respective time interval, each node in the first subset of nodes associated with a respective account of the plurality of accounts;
update, by the graph neural network in a forward pass of the graph neural network, a plurality of weights for the first node at the respective time interval;
receive, by the graph neural network, a respective message from each of a second subset of the plurality of nodes connected to the second node, each message comprising the embedding vector reflecting the current state of the respective node of the second subset at the respective time interval, each node in the second subset associated with a respective creditor of the plurality of creditors;
update, by the graph neural network in a backward pass of the graph neural network, a plurality of weights for the second node at the respective time interval;
receive a credit limit of a first account;
compute, by the graph neural network based on a plurality of attributes of the first account, the updated plurality of weights for the first node, the updated plurality of weights for the second node, and the lending network graph, an updated credit limit for the first account, the updated credit limit corresponding to the respective time interval; and
store the updated credit limit for the first account as the credit limit for the first account during the respective time interval.

9. The non-transitory computer-readable storage medium of claim 8, further storing instructions that when executed by the processor cause the processor to, at each time interval:
determine a plurality of features of the embedding vector, each feature corresponding to a respective element of the embedding vector;
compute, by the graph neural network, a respective first average for each feature of the embedding vector based on the messages received from the first subset of nodes;
apply, by the graph neural network, a respective weight of a plurality of weights for the first node to the first average for each feature; and
apply, by the graph neural network, a non-linearity function to the weighted first average for each feature to update the plurality of weights for the first node in the forward pass of the graph neural network.

10. The non-transitory computer-readable storage medium of claim 9, further storing instructions that when executed by the processor cause the processor to, at each time interval:
compute, by the graph neural network, a respective second average for each feature of the embedding vector based on the messages received from the second subset of nodes;
apply, by the graph neural network, a respective weight of a plurality of weights for the second node to the second average for each feature; and
apply, by the graph neural network, the non-linearity function to the weighted second average for each feature to update the plurality of weights for the second node in the backward pass of the graph neural network.

11. The non-transitory computer-readable storage medium of claim 10, further storing instructions that when executed by the processor cause the processor to, prior to a first time interval of the plurality of time intervals:
receive a credit request from the first account;
receive the plurality of attributes associated with the first account, wherein at least a portion of the plurality of attributes are specified in a first credit report for the first account; and
compute, by the graph neural network based on the plurality of attributes and the lending network graph, a score for the first credit request; and
approve the first credit request based on the score exceeding a threshold.

12. The non-transitory computer-readable storage medium of claim 11, wherein the graph neural network receives a respective second message from each node of the first subset to compute the score for the first credit request.

13. The non-transitory computer-readable storage medium of claim 11, further storing instructions that when executed by the processor cause the processor to, at each time interval:
receive a graph of transaction data based on a plurality of transactions for the first account, the plurality of transactions associated with the respective time interval; and
receive the plurality of attributes associated with the first account, at least a portion of the plurality of attributes specified in a second credit report for the first account, the second credit report associated with the respective time interval; and
wherein the updated credit limit is further computed for the respective time interval based on the graph of transaction data.

14. The non-transitory computer-readable storage medium of claim 8, wherein the graph neural network updates the embedding vector for each of the plurality of nodes associated with creditors in the forward pass, wherein the graph neural network updates the embedding vector for each the plurality of nodes associated with accounts in the backward pass.

15. A method, comprising:
at each of a plurality of time intervals:
receiving a lending network graph generated based on a plurality of loans, each loan associated with at least one creditor of a plurality of creditors and one account of a plurality of accounts, the lending network graph comprising a plurality of nodes;
identifying, in the lending network graph, a first node and a second node of the plurality of nodes, the first node associated with a first creditor of the plurality of creditors and the second node associated with a first account of the plurality of accounts;
receiving, by a graph neural network, a respective message from each of a first subset of the plurality of nodes connected to the first node, each message comprising an embedding vector reflecting a current state of the respective node of the first subset at the respective time interval, each node in the first subset of nodes associated with a respective account of the plurality of accounts;

updating, by the graph neural network in a forward pass of the graph neural network, a plurality of weights for the first node at the respective time interval;

receiving, by the graph neural network, a respective message from each of a second subset of the plurality of nodes connected to the second node, each message comprising the embedding vector reflecting the current state of the respective node of the second subset at the respective time interval, each node in the second subset associated with a respective creditor of the plurality of creditors;

updating, by the graph neural network in a backward pass of the graph neural network, a plurality of weights for the second node at the respective time interval;

receiving a credit limit of a first account;

computing, by the graph neural network based on a plurality of attributes of the first account, the updated plurality of weights for the first node, the updated plurality of weights for the second node, and the lending network graph, an updated credit limit for the first account at the respective time interval; and storing the updated credit limit for the first account as the credit limit for the first account during the respective time interval.

16. The method of claim 15, further comprising, at each time interval:

determining a plurality of features of the embedding vector, each feature corresponding to a respective element of the embedding vector;

computing, by the graph neural network, a respective first average for each feature of the embedding vector based on the messages received from the first subset of nodes;

applying, by the graph neural network, a respective weight of a plurality of weights for the first node to the first average for each feature; and applying, by the graph neural network, a non-linearity function to the weighted first average for each feature to update the plurality of weights for the first node in the forward pass of the graph neural network.

17. The method of claim 16, further comprising, at each time interval:

computing, by the graph neural network, a respective second average for each feature of the embedding vector based on the messages received from the second subset of nodes;

applying, by the graph neural network, a respective weight of a plurality of weights for the second node to the second average for each feature; and applying, by the graph neural network, the non-linearity function to the weighted second average for each feature to update the plurality of weights for the second node in the backward pass of the graph neural network.

18. The method of claim 17, further comprising, prior to a first time interval of the plurality of time intervals:

receiving a credit request from the first account;

receiving the plurality of attributes associated with the first account, wherein at least a portion of the plurality of attributes are specified in a first credit report for the first account; and computing, by the graph neural network based on the plurality of attributes and the lending network graph, a score for the first credit request; and approving the first credit request based on the score exceeding a threshold.

19. The method of claim 18, wherein the graph neural network receives a respective second message from each node of the first subset to compute the score for the first credit request.

20. The method of claim 18, further comprising, at each time interval:

receiving a graph of transaction data based on a plurality of transactions for the first account, the plurality of transactions associated with the respective time interval; and receiving the plurality of attributes associated with the first account, at least a portion of the plurality of attributes specified in a second credit report for the first account, the second credit report associated with the respective time interval; and wherein the updated credit limit is further computed for the respective time interval based on the graph of transaction data.

* * * * *